No. 821,959. PATENTED MAY 29, 1906.
T. H. OXNAM.
MITER GAGE.
APPLICATION FILED FEB. 5, 1906.

Witnesses. Inventor.
Thomas H. Oxnam
By Geo. H. Strong. Atty

UNITED STATES PATENT OFFICE.

THOMAS H. OXNAM, OF LOS ANGELES, CALIFORNIA.

MITER-GAGE.

No. 821,959.  Specification of Letters Patent.  Patented May 29, 1906.

Application filed February 5, 1906. Serial No. 299,459.

*To all whom it may concern:*

Be it known that I, THOMAS H. OXNAM, a citizen of the United States, residing at Los Angeles, in the county of Los Angeles and State of California, have invented new and useful Improvements in Miter-Gages, of which the following is a specification.

My invention relates to an improved miter-gage and templet for use in laying off angles for miter or bevel joints and for accurately sawing stuff to a determined angle.

The object of the invention is to provide a simple, handy, compact, one-piece tool for the use of carpenters, millwrights, machinists, and others in laying off and cutting bevels, which is capable of being carried in the vest-pocket, which will always be ready for use, which will lay off a determined angle and is reversible to lay off the complement of the same angle, and which especially is capable of performing the functions of the usual miter-box in guiding the saw to cut these angles.

The invention consists, essentially, of a plate which is substantially  shape in cross-section with the ends of the plate lying in convergent planes which are perpendicular to the body of the plate.

Figure 1:
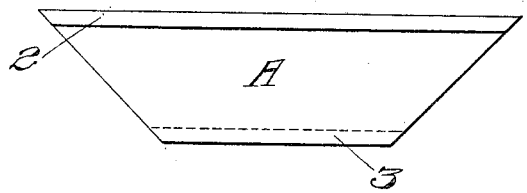
Figure 2:
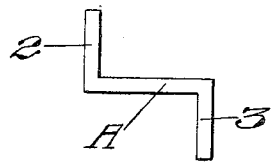
Figure 3:
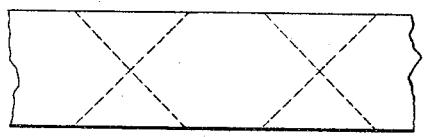

Having reference to the accompanying drawings, Figure 1 is a plan view of my miter-gage. Fig. 2 is an end view of the same. Fig. 3 is a diagrammatic plan view showing bevels which may be cut by my device.

A represents a base-plate which is essentially trapezoidal in outline. This plate has a lateral guide-flange 2 along its longer edge standing at right angles to the plate and a similar flange 3 along the opposite parallel edge, but projecting from the opposite side of the plate. The two flanges lie in parallel planes.

The ends of the plate and the ends of the flanges are beveled, so that said ends lie in two convergent planes which stand each at an angle of forty-five degrees from the flange 2 and perpendicular to the base-plate A. The angles of these beveled ends, however, may be varied, if desired, in different gages for making various oblique cuts.

The base-plate may be of any suitable or desired length, and the flanges may be of any desired height. The drawings represent an actual full-size working gage suitable for cutting bevels or small moldings, &c.

The tool may be made of wood, metal, or any other suitable material.

In operation the tool is laid on a piece of work to be beveled with one flange hooked over the front or top of the piece, according to which way the bevel is to be cut, as indicated in Fig. 3, or the other flange projects out enough from the plate for its end to provide a guide for the saw and maintain the blade perpendicular to the surface of the work.

Turning the tool over and laying the other flange against the work allows a reverse angle to be cut. One flange serves as rest for the tool against the work and the other flange serves as a guide to the saw.

The device is simple, cheap, and durable. There are no movable parts, and hence no opportunity for accidental disarrangement of its angles. The tool is all in one rigid piece. With miter-gages having movable parts often great inconvenience and faulty workmanship result by the loosening of a set-screw or the accidental movement of one part relative to another.

Having thus described my invention, what I claim, and desire to secure by Letters Patent, is—

1. A miter-gage comprising a plate which is substantially  shape in cross-section, both ends of the plate being beveled and lying in convergent planes which are perpendicular to the intermediate body portion of the plate.

2. A miter-gage comprising a plate with oblique ends lying in planes at right angles to the plate, said plate having a lateral longitudinal projection along one of its edges and extending at right angles to the plate, and said plate having another projection parallel with the first one along the opposite edge of the plate but on the opposite side thereof, said projections having their ends beveled in planes coincident with the bevels of the ends of the plate, said projections operating one as a stop to hold the tool against the work and the other as a guide to the saw.

In testimony whereof I have hereunto set my hand in presence of two subscribing witnesses.

THOMAS H. OXNAM.

Witnesses:
 JNO. P. FULTS,
 MARIE H. HUEHNER.